(No Model.)  5 Sheets—Sheet 1.
S. D. WARFIELD.
GREEN CORN CUTTER.
No. 304,149. Patented Aug. 26, 1884.
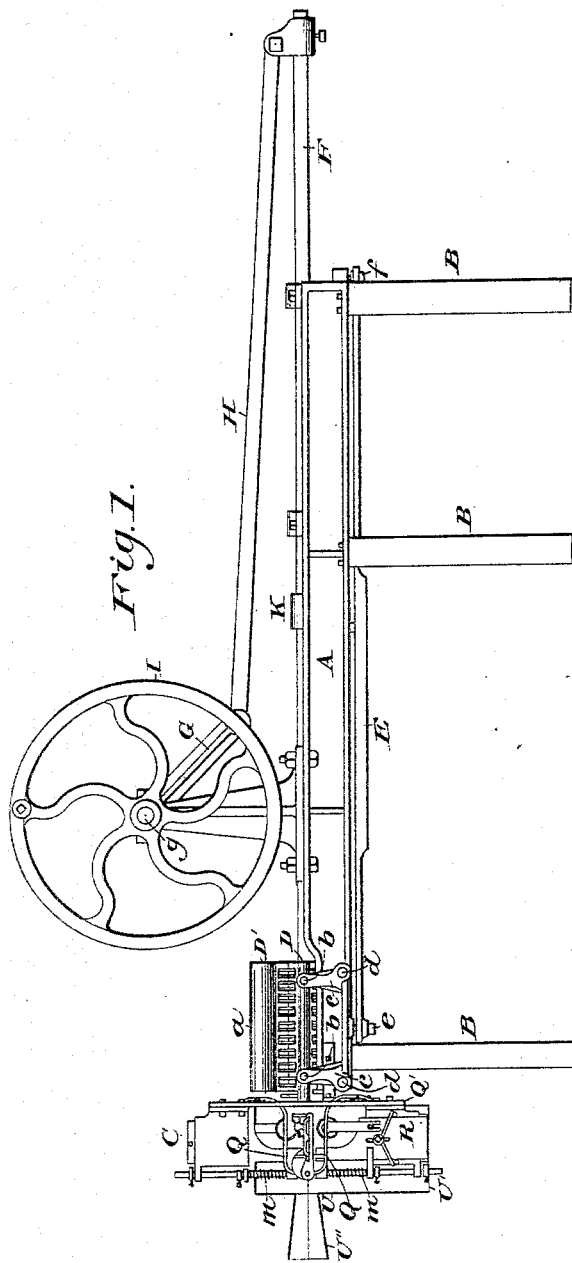
Fig. I.
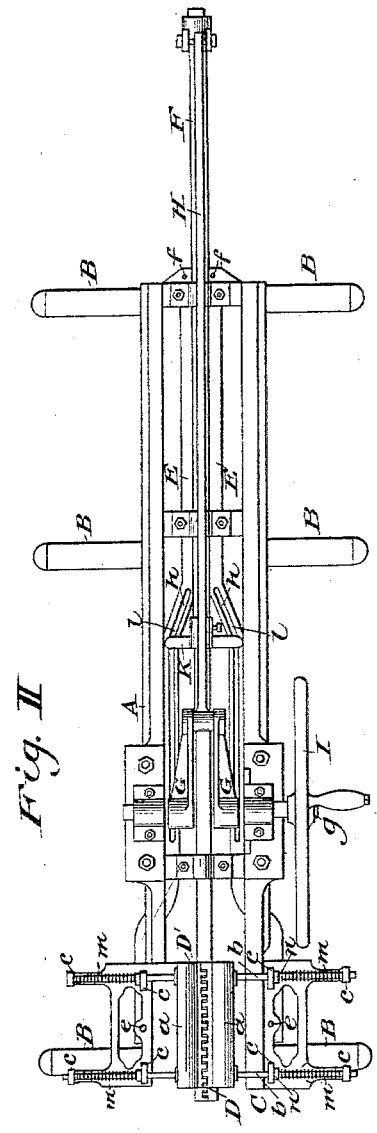
Fig. II.
Witnesses:
Danl Fisher
Chas. B. Cassady
Inventor.
Sol. Davies Warfield
by G. H. W. Howard
Atty.

(No Model.) 5 Sheets—Sheet 2.
S. D. WARFIELD.
GREEN CORN CUTTER.
No. 304,149. Patented Aug. 26, 1884.
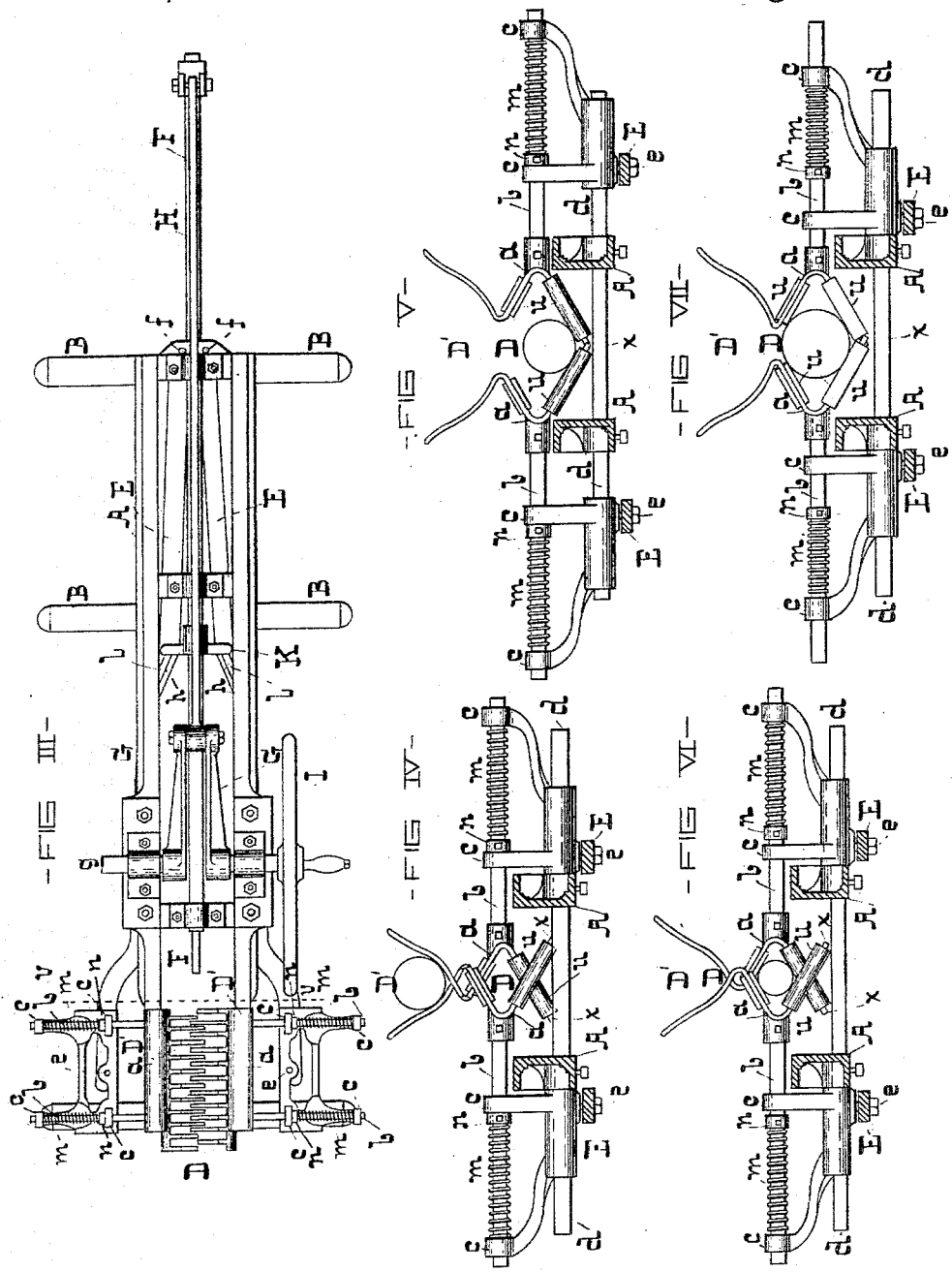
WITNESSES
Danl Fisher
Chas. B. Cassady
INVENTOR
Solomon Warfield,
by G. W. J. Howard,
Atty.

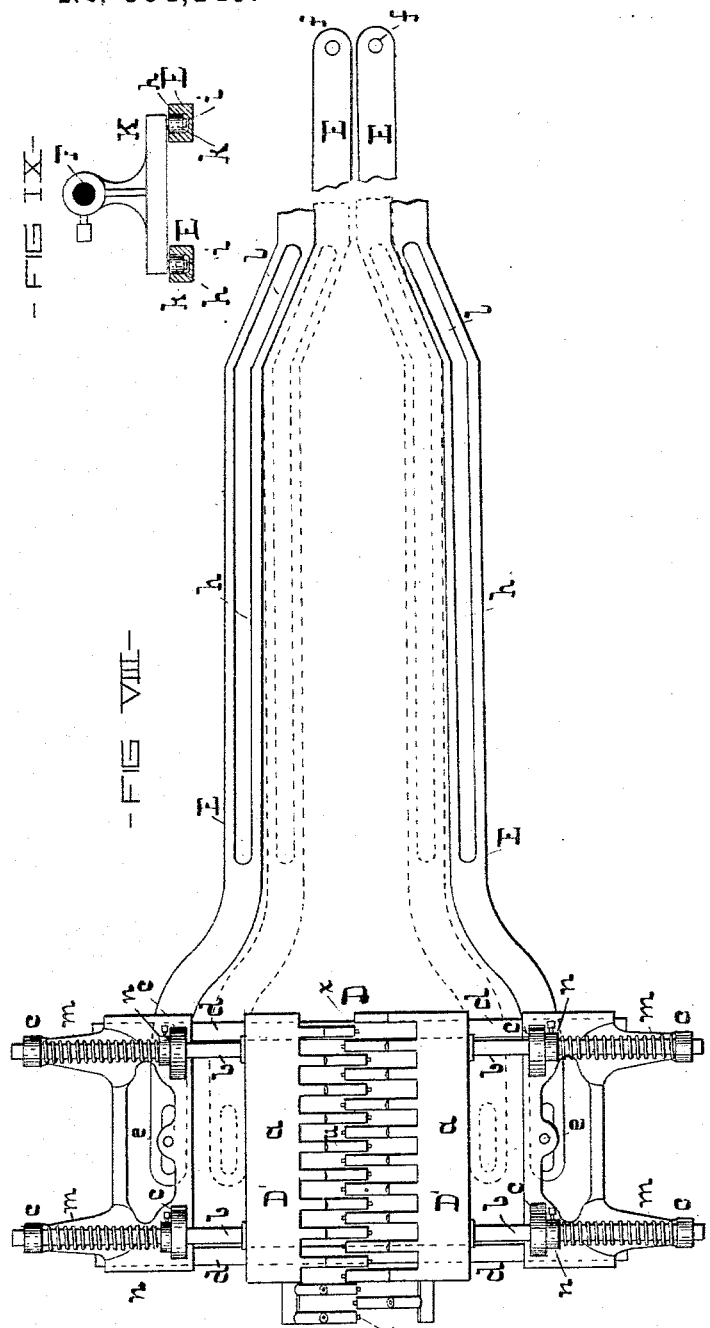

(No Model.) 5 Sheets—Sheet 4.
S. D. WARFIELD.
GREEN CORN CUTTER.
No. 304,149. Patented Aug. 26, 1884.
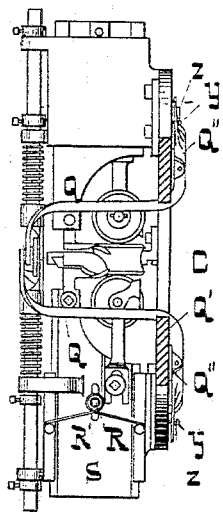
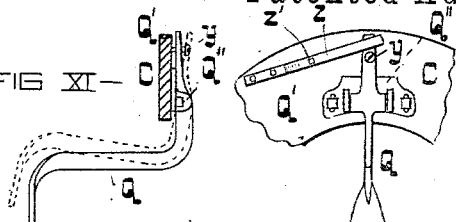
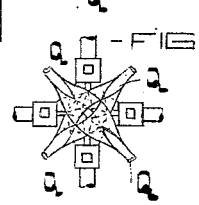
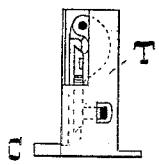
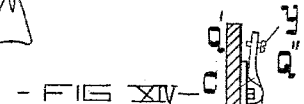
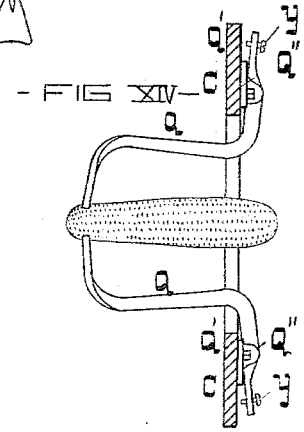
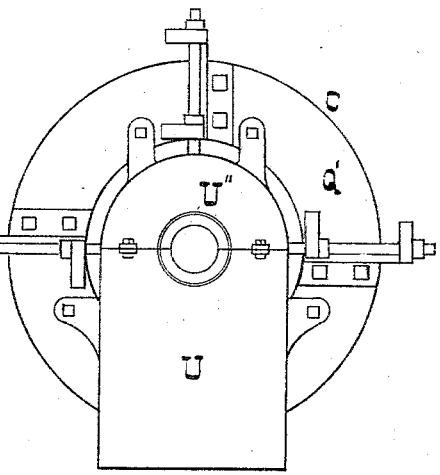
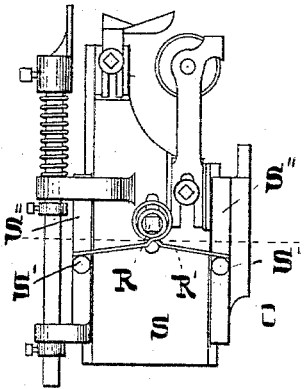
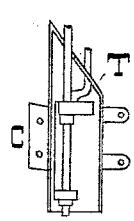
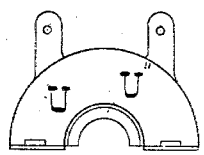
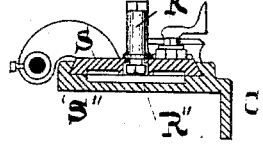
WITNESSES
Danl Fisher
Chas B Cassady
INVENTOR
Sol Davis Warfield
by G.W.J. Howard
attys (No Model.) S. D. WARFIELD. 5 Sheets—Sheet 5.
GREEN CORN CUTTER.
No. 304,149. Patented Aug. 26, 1884.
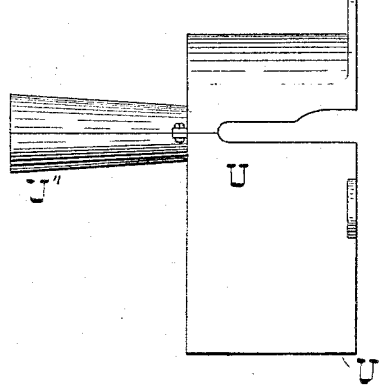
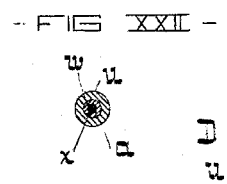
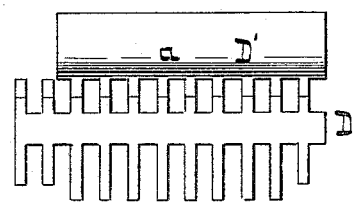
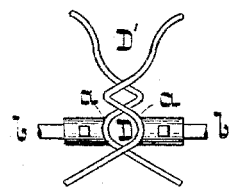
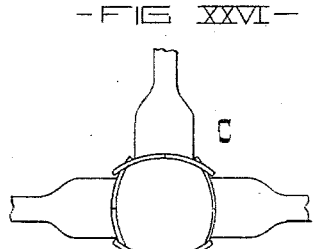
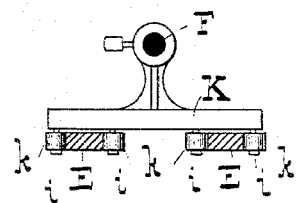
WITNESSES
Danl Fisher
Chas. B. Cassady
INVENTOR
S. Davies Warfield,
by G. W. W. Howard,
Atty.

UNITED STATES PATENT OFFICE.

SOLOMON DAVIES WARFIELD, OF BALTIMORE, MARYLAND.

GREEN-CORN CUTTER.

SPECIFICATION forming part of Letters Patent No. 304,149, dated August 26, 1884.

Application filed April 14, 1884. (No model.)

*To all whom it may concern:*

Be it known that I, SOLOMON DAVIES WARFIELD, of the city of Baltimore and State of Maryland, have invented certain Improvements in Green-Corn Cutters, of which the following is a specification.

This invention relates to certain improvements in that class of green-corn cutters in which the ear is forced horizontally through a cutting-head.

In the description of the said invention which follows reference is made to the accompanying drawings, forming a part hereof, and in which—

Figure 1 is an exterior side view of the machine. Fig. 2 is a top view of Fig. 1, with the cutting-head removed and the centering devices closed. Fig. 3 is a similar view to Fig. 2, except that the centering devices are open. Figs. 4, 5, 6, and 7 are sectional views, on an enlarged scale, of the machine, taken through the dotted line $v\ v$, Fig. 3, and showing the centering devices in the various positions which they assume during the operation of the machine. Fig. 8 is an enlarged plan view of the centering devices, and certain parts of the machine immediately connected therewith. Figs. 9 to 25, inclusive, are views of details of the machine. Figs. 26 and 27 illustrate modifications in the construction of the cutting-knives and their attachments. Fig. 28 shows a modified construction of another part of the machine.

A is the frame of the machine supported on suitable legs, B B.

C is the cutting-head, secured in any appropriate manner to the end of the frame A. For a detailed description of this head, see Letters Patent No. 281,588, granted to me on the 17th day of July 1883, as the head herein shown corresponds to that described in the said Letters Patent, except in certain features hereinafter specified.

The centering devices hereinbefore alluded to consist of a grated clasp, D, in two interlocking parts, $a\ a$, which are secured to rods $b$. These rods are adapted to slide radially of the axial line of the ear, and are sustained by arms $c\ c$, which are connected together, and in turn slide in a corresponding direction on fixed bars $d\ d$, which pass through and are secured to the frame A. These sustaining-arms are pivoted to levers E E at $e\ e$, which have their fulcra at $f f$ at the rear end of the frame A. The upper portion of the grated clasp D forms a receiver, D', for the ear. (See particularly Figs. 4, 5, 6, and 7, in which the said ear rests before the centering devices are opened.)

F is a rod, by means of which the ear is forced from the centering devices through the cutting-head, and it has a longitudinal reciprocating movement, obtained through the medium of the crank G and the connecting-rod H.

I is a balance-wheel on the driving-shaft $g$, to give to the shaft regularity of rotation, and the said shaft may be driven by hand or power, as desired. The levers E have slots or grooves $h$, (see particularly Fig. 8,) and a cross-head, K, (see Fig. 9,) which is fastened to the rod F and moves with it, is provided with pins $i$, carrying rollers $k$, which latter rest in the grooves $h$ in the said levers.

In order that the longitudinal reciprocating movement of the rod F and its cross-head K may effect an alternate opening and closing of the clasp D, the slots $h$ have inclined offsets $l$. The rollers $k$, coming in contact with the inner inclined surfaces of the slots $h$ at the commencement of the forward stroke of the rod F, cause the levers E to approach each other and close the clasp D. As soon as the rollers have passed from the inclines $l$ into the straight portions of the grooves $h$ beyond them, the closing of the clasp ceases, and it is retained in a closed position until, in the return-stroke of the rod F, the rollers $k$ again enter the inclines $l$. The rollers in coming in contact with the outer surfaces of the said inclines in the return-stroke of the rod F, open the levers, and with them the clasp. An alternate construction of this portion of the machine may consist of levers without grooves, and a cross-head with rollers to bind or bear against the edges of the levers, as shown in Fig. 28.

Parts of the machine not yet alluded to will be described, and their uses set forth in the description of the operation of the invention which follows. Supposing the machine to be in operation, with all its parts in position, as shown in Fig. 3, and with an ear in the clasp, as indicated in Fig. 5, the rod F, in its forward stroke, first effects the closing of the clasp, as before described, in which operation the ear is raised from the bottom of the said clasp to a central position therein, as shown in Figs. 6 and 7, which figures correspond, except that in them different-sized ears are shown. At the completion of the clasping and centering operations, as just described, the forward end of the rod F has reached the entrance of the clasp D, and in its continued forward movement forces the now accurately centered ear from the clasp into and through the cutting-head.

In order that ears of all sizes may be accurately centered, which is absolutely necessary to the proper cutting of corn, I make the parts *a a* of the clasp D to interlock at both top and bottom, when the smallest ears are held between them, and as the movement of the cross-head gives, under all circumstances, a positive motion to the supporting-arms *c c*, which carry the rods *b*, to which the parts *a a* of the clasp B are fastened, I place springs *m* on the rods *b*, and confine them endwise between the outer arm, *c*, and collars *n*, which are adjustable in position to allow of any desired tension being obtained. During the return or backward stroke of the rod F, and before the clasp is again opened, an ear is deposited in the receiver D', formed by the upper portions of the clasp D, and when the said clasp is again opened the said ear falls to the bottom of the clasp, and to the position heretofore described, and shown in Fig. 5.

As the ear must be held firmly within the clasp D, in order that it may be accurately centered, I provide the clasp with rollers *u*, to reduce friction, and thereby prevent abrasion of the outer casing of the grain. (See particularly Figs. 8, 22, and 23.) These rollers are of rubber or other soft material, with metallic cores *w*, (see Fig. 22,) which cores revolve with the rollers proper on the bars *x* of the clasp. In Figs. 24 and 25 the clasp is shown without rollers, and with the interlocking-bars flattened. This form of clasp may be used where practicable.

While the cutting-head C, as an entirety, is substantially the same as that shown and described in Letters Patent No. 281,588, before alluded to, and to which reference should be made, it differs in the following particulars: Q Q are levers, pivoted to the annular plate Q' of the head by means of adjustable brackets Q''. The outer ends of these levers are adapted as scrapers, which are used in connection with the scrapers described in the said Letters Patent. These new scrapers are placed so that the ear enters from the pivoted ends. Consequently the entrance of the ear has a tendency to expand or distend the scrapers, (see Fig. 14,) and blunt ears, or those entirely devoid of a point, can be entered with the same facility as pointed ones. Further, with the scrapers pivoted as described and shown in Figs. 11 and 14, a sharp scraping-edge is always presented to the cob. Rear extensions of the levers Q have set-screws *y*, which bear against the annular plate Q', and prevent the entire closing of the scrapers. Springs *z* give the necessary resiliency to the scrapers Q, and the elasticity of the said springs may be changed by means of the set-screws *z*. (See Fig. 12.)

A back view of the new and old scrapers is shown in Fig. 13.

In Figs. 15 and 19 are shown the radially-sliding knife-plate and its attachments, which are described and shown in Letters Patent No. 281,588, before alluded to. In these figures it will be seen that the pin R, which holds the spring R', is adjustable, it being inserted in a slot in the said knife-plate S, and fastened by a nut, R'', on the inner side thereof. (See Fig. 19.)

The object of the adjustability of the pin R is to admit of the said pin being moved toward or from the pins S', which are stationary and project from the stationary support S'' for the sliding knife-plate S. When the pin R is moved toward the pins S', the spring R' is more tightly coiled, and increased in rigidity, and vice versa.

In Figs. 16 and 17 the knife-plate and its attachments, which are immediately below the ear as it passes through the head, are shown as partially enveloped by a casing, T, to protect them against the falling corn. In Figs. 18, 20, and 21 I have shown a hood, U, which prevents scattering of the grain as cut, and it has an outlet-aperture, U', which conducts the removed grain to any suitable receptacle. A chute, U'', formed on the rear plate of the hood U, serves to convey the cob, after the removal of the grain therefrom, clear of the machine. This hood is attached to the annular plate Q', and is in two parts, one of which (see Fig. 20) may be easily and readily removed, to expose the cutting and scraping mechanism.

Figs. 26 and 27 show knives and their attachments, which may be used in the machine instead of those described in Letters Patent No. 281,588.

I claim as my invention—

1. In combination with the cutting-head of a green-corn cutter, a clasping and centering device in two parts, adapted to have a reciprocating movement radially of the ear, and to interlock above and below the ear, substantially as specified.

2. In combination with the cutting-head of a green-corn cutter, a clasping and centering device carrying interlocking rollers, substantially as and for the purpose specified.

3. In combination with the cutting-head of a green-corn cutter, clasping and centering devices adapted to have a reciprocating movement radially of the axis of the ear, levers to which the said clasping and centering devices are pivoted, having inclined offsets, as described, a longitudinally-moving central rod to force the ear from the clasping and centering devices through the said cutting-head, and a cross-head fastened to the said rod and connected with the said levers to effect the opening and closing of the clasping and centering devices in its reciprocating motion, substantially as specified.

4. In combination with the cutting-head of a green-corn cutter, clasping and centering devices adapted to have a reciprocating movement radially of the axis of the ear, levers to which the said clasping devices are yieldingly attached, and having inclines, as described, a longitudinally-moving central rod to force the ear from the said clasping and centering devices through the cutting-head, and a cross-head fastened to said central rod and connected to said levers to effect the opening and closing of the said clasping and centering devices in its reciprocating motion, substantially as specified.

5. In the cutting-head of a green-corn cutter, the combination of the annular plate Q', adjustable brackets Q'' and pivoted scraping-levers Q, the scraping-edges of the said levers being in the rear of the pivotal points, as an ear is forced through the said cutting-head, substantially as specified.

6. In combination with the sliding knife-plate S, the stationary support S'', having the fixed pins S', spring R', and the pin R, the said pin being held adjustably to the said knife-plate, substantially as and for the purpose specified.

7. In combination with the cutting-head of a green-corn cutter, the hood U, having a removable section, for the purpose described, the discharge-opening U', and chute U'', the said chute being on a line corresponding with the axis of the ear during the cutting operation, substantially as and for the purpose specified.

8. In combination with the cutting-head of a green-corn cutter, a series of supported clasping and centering rollers, and means for forcing the ear from the supported rollers to the said cutting-head, substantially as specified.

9. In combination with the cutting-head of a green-corn cutter, a series of supported interlocking clasping and centering rollers, and means for forcing the ear from the said supported interlocking rollers to the cutter-head, substantially as specified.

10. The combination, in the clasping and centering device D, of the rollers u, formed of some soft flexible material, with a metallic core, w, and the bars x, the said rollers being adapted to revolve loosely on the said bars, substantially as specified.

11. In combination with the cutting-head of a green-corn cutter, a series of supported clasping and centering rollers arranged on either side of the line of movement of the ear and adapted to have a reciprocating movement radially of the axis of the ear, and means to force the said ear from between the said supported rollers to the said cutting-head, substantially as specified.

12. In combination with the cutting-head of a green corn-cutter, a series of inclined supported clasping and centering rollers arranged on either side of the line of movement of the ear and adapted to have a reciprocating movement radially of the axis of the ear, and means to force the said ear from between the said supported rollers to the said cutting-head, substantially as specified.

13. In a green-corn cutter, the combination of a cutting-head and pivoted scraping devices with the pivotal points radially adjustable, substantially as and for the purpose specified.

SOLOMON DAVIES WARFIELD.

Witnesses:
WM. T. HOWARD,
CHAS. B. CASSADY.